United States Patent
Burnett

[11] Patent Number: 5,940,228
[45] Date of Patent: Aug. 17, 1999

[54] OBJECTIVE LENS FOCUS ASSEMBLY

[75] Inventor: Richard L. Burnett, Alexandria, Va.

[73] Assignee: The United States of America as represented by the Secretary of the Army, Washington, D.C.

[21] Appl. No.: 08/997,999

[22] Filed: Dec. 24, 1997

[51] Int. Cl.⁶ .............................. G02B 7/02; G02B 23/00
[52] U.S. Cl. ...................... 359/825; 359/830; 359/410; 359/425
[58] Field of Search ...................................... 359/409, 410, 359/425, 426, 702, 704, 706, 823, 825, 827, 830

[56] References Cited

U.S. PATENT DOCUMENTS

| | | | |
|---|---|---|---|
| 2,346,291 | 4/1944 | Cisski | 29/434 |
| 2,357,327 | 9/1944 | Harris et al. | 396/144 |
| 2,362,603 | 11/1944 | Wittel | 359/825 |
| 3,254,585 | 6/1966 | Gorey | 359/825 |
| 3,817,601 | 6/1974 | Colaiace et al. | 359/700 |
| 5,381,272 | 1/1995 | Kato et al. | 359/823 |
| 5,687,034 | 11/1997 | Palmer | 359/827 |
| 5,737,119 | 4/1998 | Mladjan et al. | 359/353 |
| 5,831,778 | 11/1998 | Chueh | 359/829 |

Primary Examiner—Thong Nguyen
Assistant Examiner—Mark A. Robinson
Attorney, Agent, or Firm—Milton W. Lee; John E. Holford; Alain L. Bashore

[57] ABSTRACT

A modified objective lens focus assembly of a night vision image intensifier monocular for providing focus control travel adjustment that has substantially free movement for a full range of travel. The focus ring and lock ring are cemented together as one subassembly which is then cemented to the monocular housing. The objective cell is then rotational within the assembly without use of separate focus ring and lock ring.

1 Claim, 3 Drawing Sheets

OBJECTIVE LENS FOCUS ASSEMBLY

BACKGROUND OF THE INVENTION

1. Field of the Invention

The present invention generally relates to objective lens focus assemblies and more specifically, to the AN/AVS-6 Aviators Night Vision Imaging System (ANVIS) objective assembly.

2. Description of Prior Art

Early and current production of the ANVIS objective assembly utilizes a lock ring that utilizes torque to hold the components of the assembly in place on the monocular housing. This design distorts the area of the monocular housing where the objective lens cell must travel, resulting in erratic and binding focus adjustments. All of the components associated with the objective lens assembly and the monocular housing are manufactured with plastic, which are subject to change in shape under these conditions. User complaints include, erratic and binding movement of the focus mechanism, excessive torque required to overcome the binding which results in poor focus control.

While the prior art has reported using an objective lens assembly within the monocular housing on the ANVIS, none have established a basis for a specific apparatus and technique that is dedicated to the task of resolving the particular problem at hand. What is needed in this instance is a new objective lens assembly that eliminates prior art erratic and binding movement of the objective cell within the monocular housing.

SUMMARY OF THE INVENTION

It is therefore one object of the invention to provide a new objective lens assembly that eliminates erratic and binding movement of the objective cell within the monocular housing by not relying on mechanical pressure to secure the objective assembly to the monocular housing.

According to the invention, a modified objective lens subassembly of a night vision image intensifier monocular provides focus control travel adjustment that has substantially free movement for a full range of travel. The focus ring and lock ring are cemented together along the optical axis to form a focus/lock ring subassembly. The objective cell which is rotational within, and concentric along the optical axis to the focus/lock ring subassembly is used with a set screw to provide a stop for rotation of said objective cell within the subassembly. Other set screws within the lock ring are adjusted down with a very light tension to hold the subassembly in place while cementing the objective cell to the monocular housing. These other set screws are then removed after cementing has occurred.

The objective lens assembly is rotated by movement of the entire objective cell, not by use of a movable focus ring that requires excessive torque to overcome binding force of the prior art. There is thus eliminated any distortion to the monocular housing which is characteristic of the prior art.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

The current production model of the ANVIS has an objective lens assembly comprised of seven components. An objective lens cell, which contains a lens group to allow entrance of incoming available light. An objective focus ring about the lens group allows manual focus of the objective lens cell. A preformed packing component and slotted adapter are inserted within the focus ring to allow forming an airtight seal and moisture barrier between the objective lens cell and monocular housing. A keyway washer with wave washer is inserted around the focus ring. The keyway washer serves to limit the objective cell travel (focus) from near focus to infinity focus. The wave washer spring loads the assembly. A lock ring is set about the entire assembly to hold all components in place using four set screws.

Figure 1:
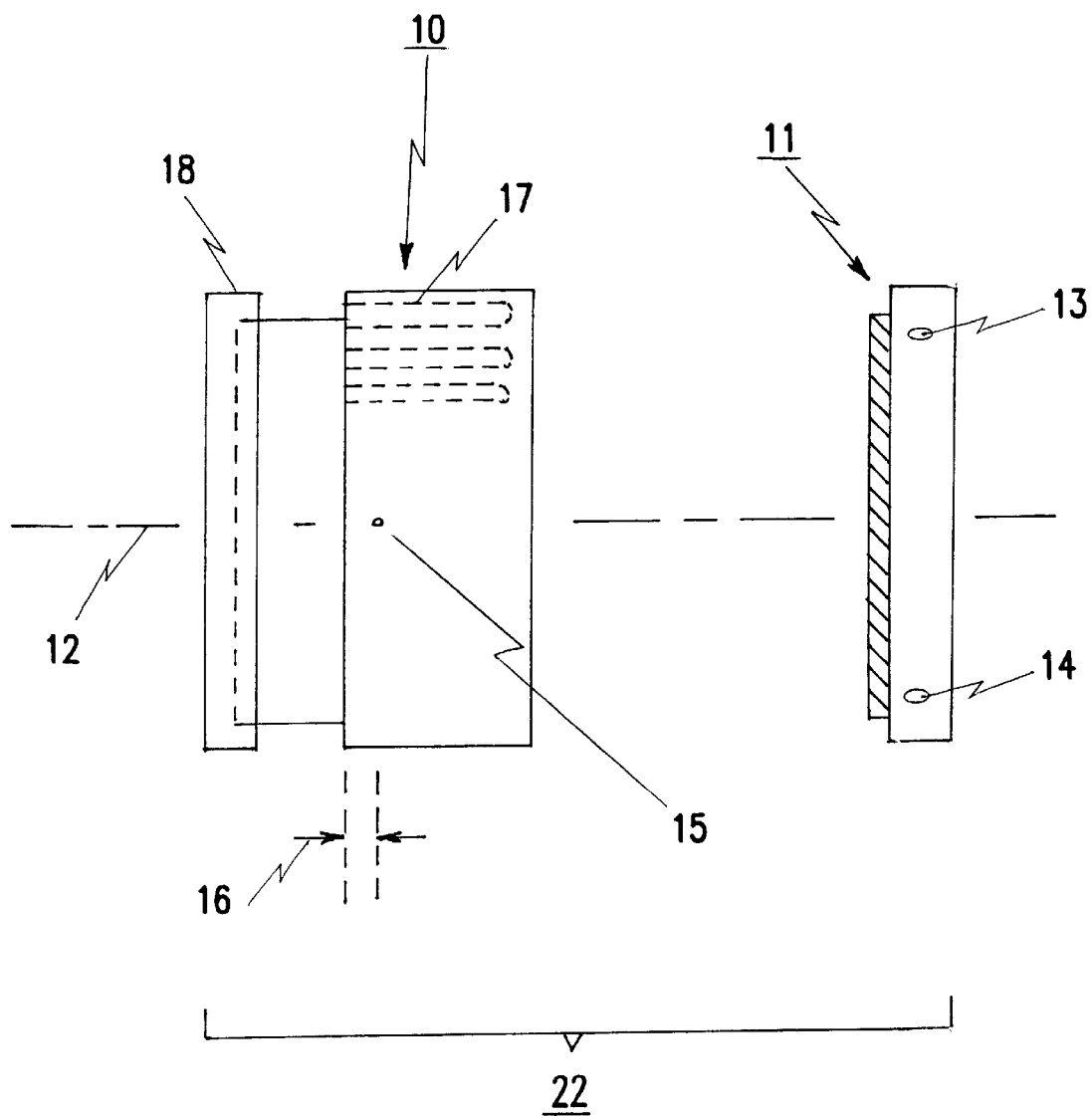
FIG. 1 is a side view of the modified focus ring and modified lock ring for the objective lens assembly of the invention.

Referring now to the drawings, and more particularly to FIG. 1, there is shown a side view of focus ring assembly 10 and lock ring 11 for the objective lens assembly of the invention. Focus ring assembly 10 includes a main body portion and a ring skirt portion concentricity positioned on front of the main body portion. Focus ring assembly 10 is mated to lock ring 11 along center axis 12 and cemented together. A conventional plastic cement such as a cyanoacrylate ester may be used. The diameter of the four existing holes in lock ring 11 (two of which are shown in FIG. 1 as holes 13 and 14) is enlarged using a #50 drill bit and threaded with a #2–56 tap. Hole 15 is located along the center axis 12 and at distance 16 shown in FIG. 1. Distance 16 is 0.10 inches, which is the distance as measured from the front of the main body of focus ring 10. Hole 15 is then drilled through the wall of focus ring 10 and threaded with #2–56 tap. All focus ring ridges may be optionally removed by conventional means so that the focus ring is not attempted to be manipulated by a user. Several focus ring ridges 17 are shown in phantom. Optional light interference filter 18 is positioned at the end of focus ring assembly 10 which may be used to provide a grip for moving the objective cell after all modifications have been performed as described herein.

Figure 2:
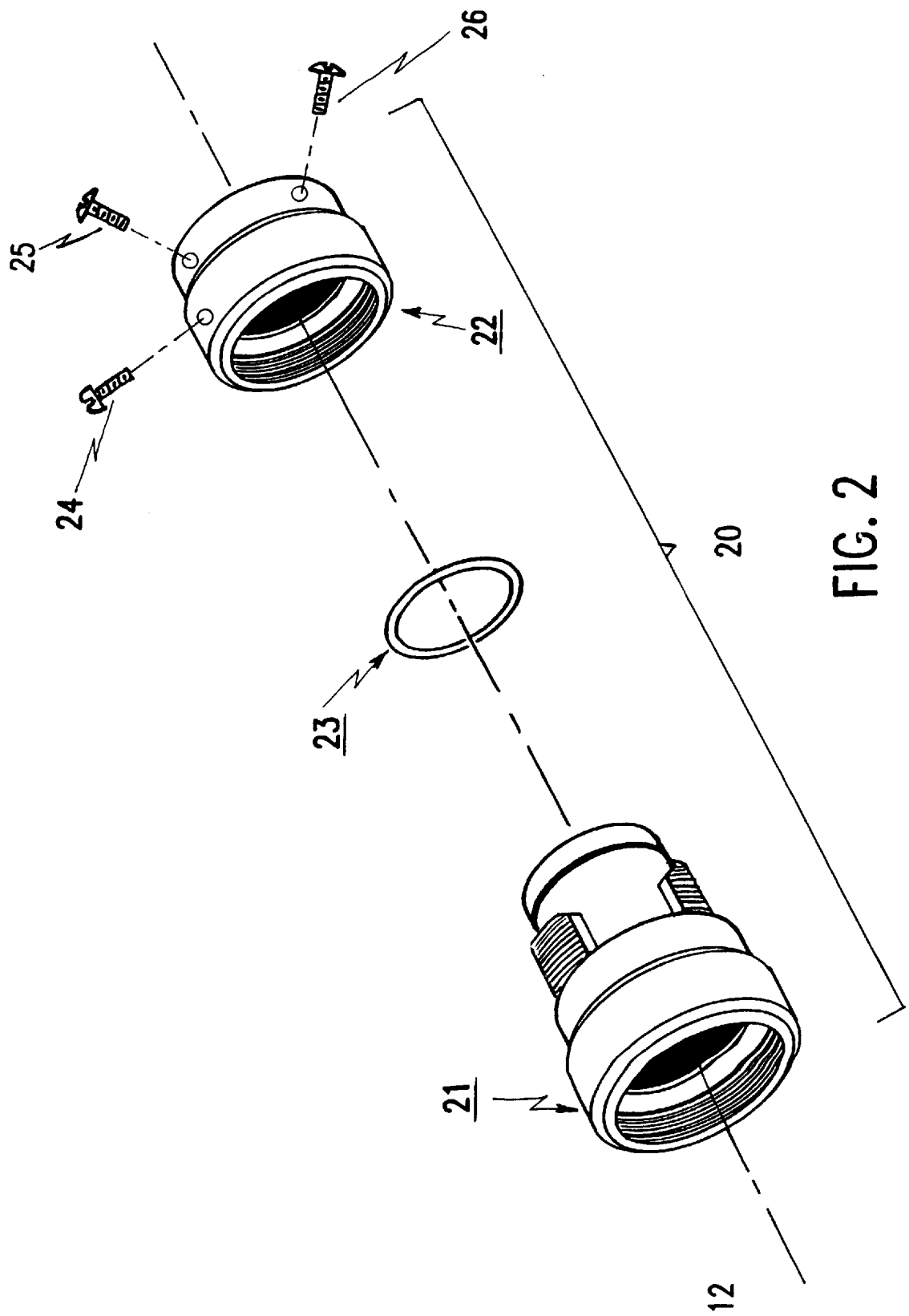
FIG. 2 is an exploded pictorial view of the complete objective lens assembly of the invention.

FIG. 2 is an exploded pictorial view of the objective lens focus assembly 20 of the invention. Objective cell 21 is installed into subassembly 22 with preformed packing 23 as shown in FIG. 2. Set screw 24 is then threaded down into hole 15 to act as a stop for objective cell rotation. Set screw 24 is a size #2–56. Objective lens cell 21 should have approximately ninety degrees of rotation.

Figure 3:
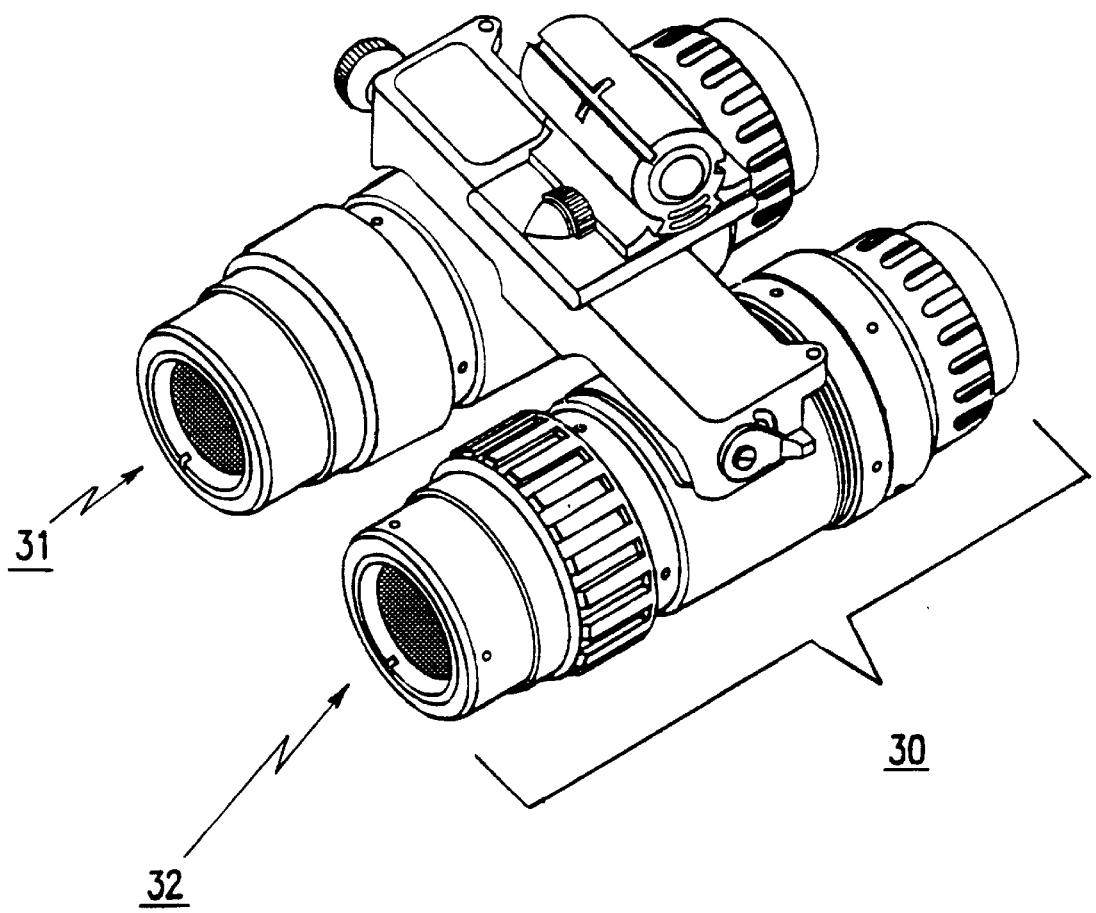
FIG. 3 is a pictorial view of the ANVIS utilizing on one monocular housing the objective lens assembly of the present invention.

FIG. 3 is a pictorial view of the ANVIS 30 showing monocular housing 31 utilizing objective lens assembly 20 of the invention. Monocular housing 32 utilizes the prior art objective lens assembly. It is understood that while only one monocular housing is shown as modified with the present invention, it is within the scope of the present invention to modify both monocular housings. Objective assembly 20 is then threaded onto monocular housing 32. Assembly 20 is rotated to set the "through infinity" limit. Four set-screws, two of which are shown in FIG. 2 as screws 25 and 26. The four set screws are sized #2–56 by ¼ inch long. The four set-screws in the lock ring is then be adjusted down with very light tension to hold the assembly in place while cementing the objective lens housing to the monocular housing. The four set-screws in the lock ring are then removed.

The operation of the present invention does not rely on mechanical pressure to secure the objective assembly to the monocular housing. The objective lens assembly is rotated by movement of the entire objective cell, not by use of a movable focus ring that requires excessive torque to overcome binding force of the prior art. There is thus eliminated any distortion to the monocular housing which is characteristic of the prior art. In lieu of modifying existing components of the objective assembly, the invention can alternatively be manufactured as a single piece using injection molding technique.

While this invention has been described in terms of a preferred embodiment consisting of the modified objective lens subassembly, those skilled in the art will recognize that the invention can be practiced with modification within the spirit and scope of the appended claims.

Having thus described my invention, what I claim as new and desire to secure by letters patent is as follows:

1. A modified objective lens focus assembly of a night vision image intensifier monocular for providing focus control travel adjustment that has substantially free movement for a full range of travel, wherein the monocular includes a monocular housing cylindrically shaped on an optical axis for containing an image intensifier subassembly which provides image intensification with two monocular housing ends, an objective lens subassembly removably attached at one monocular housing end on the same optical axis which allows entrance of incoming light and providing focus control, an eyepiece lens subassembly removably attached to the other monocular housing end on the same optical axis for containing an eyepiece lens and providing diopter control, the improvement comprising:

a ring subassembly which includes a focus ring and a lock ring both fixedly attached permanently and concentrically about the optical axis;

an objective cell which is rotational within, and concentric about the optical axis of said ring subassembly;

a means for providing a rotational stop of said objective cell therethrough said ring subassembly;

a means for fixed permanent attachment of said ring subassembly to the monocular housing at a predetermined position for fixed permanent attachment to said monocular housing, whereby rotation of the objective cell within the fixedly mounted ring subassembly achieves focus control travel adjustment that is a substantially free movement for a full range of travel.

* * * * *